Aug. 1, 1961 M. SCADRON 2,994,733
CONNECTOR FOR THERMOCOUPLES
Filed Oct. 1, 1959
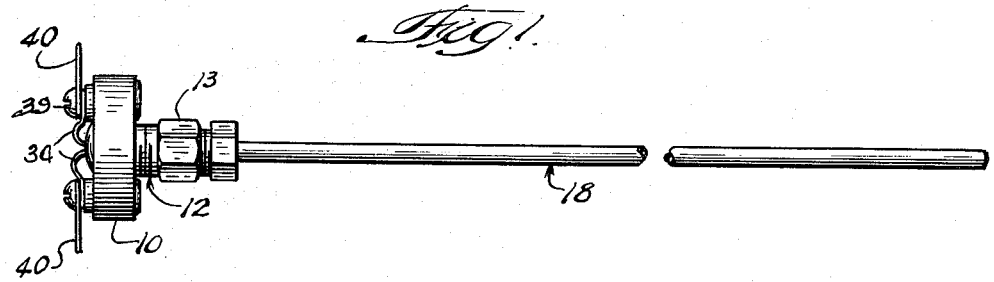
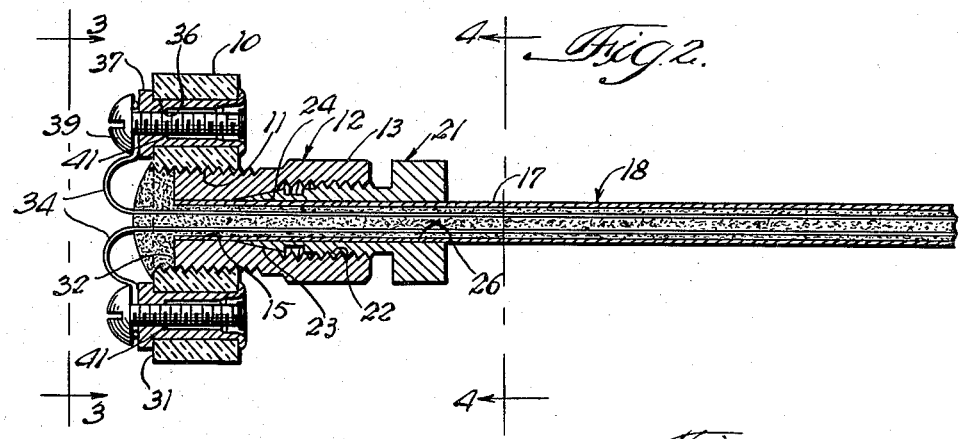
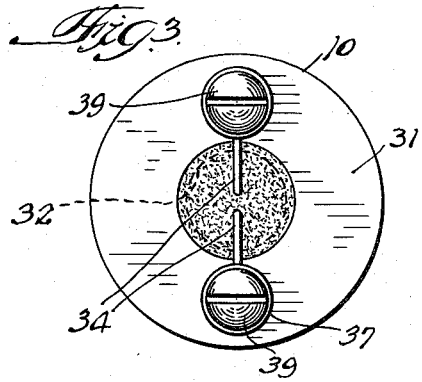
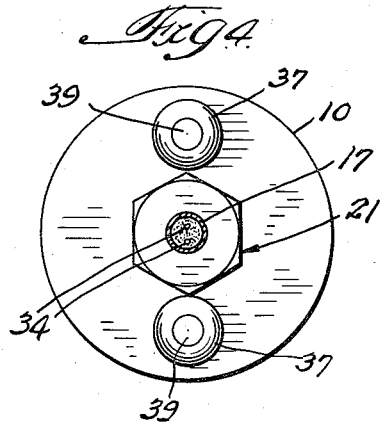
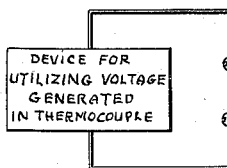
INVENTOR.
Marvin Scadron
BY ര
United States Patent Office 2,994,733
Patented Aug. 1, 1961

2,994,733
CONNECTOR FOR THERMOCOUPLES
Marvin Scadron, Skokie, Ill., assignor to Aero Research Instrument Company, Inc., Chicago, Ill.
Filed Oct. 1, 1959, Ser. No. 843,789
2 Claims. (Cl. 174—77)

The present invention relates to a device for connecting a thermocouple or similar element to an exterior circuit.

Certain types of heating elements, thermocouples and the like comprise a tubular sheath enclosing a pair of conductors of comparatively small diameter in order to support and protect the same. Such metals may be Nichrome, commonly used for resistance heating, Chromel-Alumel and constantan used for thermocouples and others. The conductors are permanently located within the sheath by means of a suitable electrical insulator, e.g. compacted magnesium oxide. The conductors are brought out beyond the sheath for connection to the exterior circuit. Heretofore the obtaining of a reliable junction with the exterior circuit has presented somewhat of a problem if the junction is one which must be interrupted at intervals for repair or replacement of the sheathed component. Not only must there be suitable mechanical support for the sheath, which is generally elongated and held only at one end, but the junction of the conductors therein to the exterior leads is desirably of an easily disconnectible character.

My invention relates to an improved device for a sheathed component of the character referred to which serves the dual function of mechanical support and expeditious connection of the leads thereof to an exterior circuit.

The principal object of the invention resides in providing a connector for the purpose aforesaid which includes means for clampingly supporting the elongated sheath at one end, means for supporting the protruding ends of the conductors therewithin and means for connecting these conductors to exterior leads.

Other objects and advantages will become apparent from the following description which, taken with the accompanying drawing, discloses a preferred mode of carrying the invention into practice.

In this drawing:

FIG. 1 shows, exemplificatively, a thermocouple of a common type together with the invention connector;

FIG. 2 is a longitudinal cross section of FIG. 1, somewhat enlarged;

FIG. 3 is an end view in the direction of the arrows 3—3 of FIG. 2;

FIG. 4 is a cross section taken on the line 4—4 of FIG. 2; and

FIG. 5 is a side view of the device of FIG. 1, together with means for utilizing the voltage generated in the thermocouple.

Turning now to the drawing I have shown a connector comprising an electrically-insulating body 10 having a cylindrical configuration and preferably of ceramic material, such as Steatite. As will later appear the device may serve to connect two, four or more conductors. Therefore the cylindrical form permits convenient spacing of the terminals about the axis thereof.

The center of the body 10 is provided with a threaded hole 11 to receive a corresponding nipple 12 including a hexagonal or similar portion to accommodate a wrench whereby the nipple may be tightly united to the body. By employing a tapered thread a reliable wedging fit may be realized.

The nipple 12 has a bore 15 snugly receiving the sheath 17 of the component 18, e.g. a thermocouple of conventional form. A nut 21 is threadedly received in a corresponding hole 22 in the outer end of the nipple 12 and is provided with a tapered end 23 congruent with a bore 24 of the nipple whereby, when the nut is tightened, the end 23 is squeezed into gripping contact with the sheath 17 and the same reliably and rigidly held in position. It will be seen that the nut 21 is bored throughout at 26 for snug reception of the sheath 17 whereby an extended area of support is presented to the adapter thereby. The arrangement is such that, when the nipple 12 is forced home the end thereof is short of the face 31 of the body 10 to define a cavity 32; and the sheath 17 will be positioned substantially flush with the inner end of the nipple. The leads, such as 34—34 are brought out straight and the cavity 32 is then filled with a suitable, preferably ceramic, cement which will harden to a rigid mass, e.g. Sauereisen cement. Thus the leads are permanently embedded in a manner avoiding short circuiting or grounding.

A plurality of through bores 36, in the example, two, is provided in the body 10 and into each an internally threaded sleeve 37 is fitted. One end of the sleeve is flanged and other is swaged over to secure the sleeve non-rotatably to the body. A captive screw 39 is engaged in each sleeve, the distal end of the shank of the screw being upset to abut the shoulder 41 whereby the screw may be withdrawn partially for normal manipulation, but may not be completely withdrawn and misplaced. Each of the conductors 34 is looped around an individual screw 39. Thus, when the component and connector are installed in their ultimate environment the exterior leads 40 need simply be wound about the screws 39 and the same tightened.

It will be understood that the invention device solves one of the more difficult problems encountered in thermometry wherein thermocouples are used for sensing temperature change. Heretofore, the connection between the thermocouple wires and the exterior circuit have been largely made by the use of intermediate conductors which were joined to the thermocouple wires in any approved manner and then to the exterior circuit. As a result unnecessary additional junctions of dissimilar metals were introduced and these, in turn, would introduce errors due to thermocouple action in their own right. With the use of the instant invention, the exterior circuit is coupled to the thermocouple wires directly and the errors just referred to have, therefore, been eliminated. Furthermore, it is to be noted that, in general, the materials used for thermocouple wires are generally of a brittle character and do not lend themselves to repeated handling. Heretofore the connection of these wires to an exterior source has been of a character requiring that both the exterior leads and the thermocouple leads be bent and otherwise manipulated when the connection is to be made and broken. Consequently fatigue failure of the thermocouple wires was an ever present hazard. In the instant arrangement the more or less frangible thermocouple wires are reliably anchored by means of the cementitious mass in the cavity 32, as well as by the screws 39.

It will be clear from the foregoing description that attaching members may be included for mounting the invention device on a support, or the necessary mechanical support may be applied directly about the body 10 or the sheath 17.

While I have shown a particular embodiment of my invention, it will be understood, of course, that I do not wish to be limited thereto since many modifications may be made and I, therefore, contemplate by the appended claims to cover any such modifications as fall within the true spirit and scope of my invention.

I claim:

1. A device adapted for securement of one end of an assembly of a rigid, tubular, elongated sheath enclosing a plurality of electrical conductors, the conductors extending beyond the sheath at said end thereof and adapted to detachably connect the conductors into an exterior circuit comprising: an insulating body having a pair of opposite exterior faces and a bore therethrough from one face to the other, at least a portion of said bore having threads extending inwardly from one of said faces, a nipple having a complementarily threaded end rigidly received in said threads, a nut threadedly received in said nipple, said nipple and nut having aligned bores adapted for snug reception of the tubular sheath, and cooperative inclined faces whereby tightening of said nut reduces the size of the bore therein to clamp the sheath, said nipple terminating short of the other of said body faces to define an open-ended cavity with the body bore, the extending end of the conductors passing through said cavity, a mass of electrically-insulating cement in the cavity embedding the conductors over a portion thereof to support and space the same, a plurality of headed screws secured in said body, the terminal end of the conductors being secured under the head of respective ones of said screws, said screws being adapted also to receive the leads of the exterior circuit under the heads thereof to clamp the conductors and leads in tight juxtaposed relation.

2. A device adapted for securement of one end of an assembly of a rigid, tubular, elongated sheath enclosing a plurality of electrical conductors, the conductors extending beyond the sheath at said end thereof and adapted to detachably connect the conductors into an exterior circuit comprising: an insulating body having a pair of opposite exterior faces and a bore therethrough from one face to the other, a nipple, means mutual to said bore and nipple for detachable reception of said nipple in said bore adjacent one of the body faces, a nut threadedly received in said nipple, said nipple and nut having aligned bores adapted for snug reception of the tubular sheath, means mutual to said nut and nipple for gripping the sheath upon rotation of said nut relative to said nipple, said nipple terminating short of the other said body face to define an open-ended cavity with the body bore, the extending end of the conductors passing through said cavity, a mass of electrically-insulating cement in the cavity embedding the conductors over a portion thereof to support and space the same, a plurality of headed screws received in said body, the terminal end of the conductors being secured under the head of respective ones of said screws, said screws being also adapted to receive the leads of the exterior circuit under the heads thereof to clamp the conductors in tight juxtaposed relation.

References Cited in the file of this patent

UNITED STATES PATENTS

| | | |
|---|---|---|
| 2,611,791 | Brandau | Sept. 23, 1953 |
| 2,815,663 | Lupfer | Dec. 10, 1957 |
| 2,820,840 | Cantlin et al. | Jan. 21, 1958 |
| 2,870,233 | Comer | Jan. 20, 1959 |
| 2,888,508 | Rademacher | May 26, 1959 |

FOREIGN PATENTS

| | | |
|---|---|---|
| 732,029 | Germany | Jan. 28, 1943 |